(12) United States Patent
Ishikawa et al.

(10) Patent No.: US 6,823,735 B2
(45) Date of Patent: Nov. 30, 2004

(54) ACCELERATION SENSOR

(75) Inventors: Hiroshi Ishikawa, Kawasaki (JP); Atsushi Machida, Suzaka (JP)

(73) Assignees: Fujitsu Limited, Kawasaki (JP); Fujitsu Media Devices Limited, Suzaka (JP)

( * ) Notice: Subject to any disclaimer, the term of this patent is extended or adjusted under 35 U.S.C. 154(b) by 90 days.

(21) Appl. No.: 09/962,194

(22) Filed: Sep. 26, 2001

(65) Prior Publication Data

US 2002/0095990 A1 Jul. 25, 2002

(30) Foreign Application Priority Data

Jan. 24, 2001 (JP) .......................................... 2001-016400
May 18, 2001 (JP) .......................................... 2001-150196

(51) Int. Cl.[7] ............................. G01P 15/00; G01P 15/10
(52) U.S. Cl. .............................. 73/514.02; 73/514.29; 73/514.34
(58) Field of Search ......................... 73/514.01, 514.02, 73/514.29, 514.36, 514.37, 514.34, 514.35

(56) References Cited

U.S. PATENT DOCUMENTS 5,824,904 A   10/1998   Kouhei et al. ........... 73/514.34

FOREIGN PATENT DOCUMENTS

| JP | 6-273439 | 9/1994 |
|---|---|---|
| JP | 9-304172 | 11/1997 |
| JP | 9-318650 | 12/1997 |
| JP | 11-211748 | 8/1999 |
| JP | 12-131714 | 4/2000 |
| JP | 2000-97707 | 4/2000 |
| WO | WO 89/00294 | 1/1989 |

*Primary Examiner*—Hezron Williams
*Assistant Examiner*—Jacques Saint-Surin
(74) *Attorney, Agent, or Firm*—Armstrong, Kratz, Quintos, Hanson & Brooks, LLP

(57) ABSTRACT

In an acceleration sensor including a vibrator subject to a sliding vibration and a weight section connected to the vibrator and supported at a position different from the position of the center of gravity of an assembly of the vibrator and weight section, for detecting an angular moment about the support point, which is produced at the weight section by application of acceleration, as sliding vibration with the vibrator, the acceleration sensor includes a rectangular substrate having a plurality of electrodes electrically connected to the vibrator, a formation pattern of the plurality of electrodes is symmetrical about an axis parallel to at least one side of the substrate, and the plurality of electrodes have substantially equal thickness. Since the formation pattern of the electrodes on the substrate is symmetrical and the respective electrodes have substantially equal thickness, the vibrator that is bonded to this substrate does not incline and the detection sensitivity does not vary.

6 Claims, 16 Drawing Sheets

FREQUENCY CHARACTERISTICS
OF VIBRATOR 1

MECHANICAL RESONANCE
FREQUENCY OF SUBSTRATE 3

ACCELERATION SENSOR

BACKGROUND OF THE INVENTION

The present invention relates to an acceleration sensor for detecting an acceleration, and more particularly to an acceleration sensor for detecting an acceleration, based on a sliding vibration produced by application of acceleration.

An acceleration sensor is installed in equipment, and monitors an abnormal condition of the equipment by detecting an acceleration and vibration of the equipment. For example, the acceleration sensor is used to prevent errors in reading and writing data that result from vibration and shock in a hard disk drive, to prevent hand shaking in a video camera, to actuate an air bag in a vehicle, etc.

With a reduction in size and an improvement of the performance of equipment in which an acceleration sensor is to be installed, there has been a demand for the development of a small-sized, high-performance acceleration sensor capable of being mounted on a surface of the equipment. As such a small-sized acceleration sensor, an acceleration sensor using a piezoelectric element has been conventionally put into practice. Disclosed examples of such an acceleration sensor include an acceleration sensor that detects an acceleration by using a deflection of a piezoelectric single crystal (Japanese Patent Application Laid-Open No. 11-211748/1999, etc.), and an acceleration sensor that detects an acceleration by using a deflection of piezoelectric ceramic (Japanese Patent Application Laid-Open No.6-273439/1994, etc.). Moreover, a packaging method that enables compact housing of an acceleration sensor has been proposed (Japanese Patent Application Laid-Open No. 9-318650/1997, etc.).

According to the acceleration sensors using a deflection of a piezoelectric single crystal or a deflection of piezoelectric ceramic as mentioned above, by increasing the deflection to increase the stress, the detection sensitivity can be improved. Therefore, in order to improve the detection sensitivity for high performance, the mass needs to be increased to produce a larger deflection, resulting in a problem that the acceleration sensor becomes heavier and larger in size. On the other hand, when the piezoelectric element is made thicker, it does not easily deflect and causes a problem of a lowering of the detection sensitivity. Then, for an improvement of the detection sensitivity, there have been proposals to make the piezoelectric element thinner, to stick two pieces of extremely thin piezoelectric elements together, etc, but such proposals are associated with problems that the fabrication process is complicated and the cost is increased.

Therefore, the applicant of the present invention proposed acceleration sensors capable of detecting an acceleration with good sensitivity by a small-sized structure (Japanese Patent Application Laid-Open No. 2000-97707 and Japanese Application No.12-131714/2000). Such an acceleration sensor comprises a vibrator and a weight section which is connected to the vibrator and supported at a position different from the position of the center of gravity of an assembly of the vibrator and weight section, and finds the magnitude of an applied acceleration by detecting the amount of characteristic (sliding vibration) of the vibrator corresponding to an angular moment produced at the weight section by application of acceleration.

FIG. 1 is an explanatory view illustrating the detection principle of this acceleration sensor. The acceleration sensor includes a vibrator 100, a weight section 200 and detection section 300 respectively connected to the vibrator 100. The weight section 200 is supported at a support point S, and the position of this support point S is different from the position of the center of gravity G of the vibrator 100 and weight section 200. When an acceleration in one direction (the direction of a void arrow in FIG. 1) is applied to such an acceleration sensor, an angular moment (arrow A in FIG. 1, size MLa (where M: the mass of the weight section 200, L: the length from the support point S to the center of gravity of the weight section 200, a: the applied acceleration)) about the support point S is produced. This angular moment causes a sliding vibration of the vibrator 100 (arrow B in FIG. 1). The detection section 300 detects a signal resulting from the sliding vibration corresponding to such an angular moment. Since the size of the angular moment is proportional to the magnitude of acceleration to be detected, the acceleration can be detected by detecting this signal.

Besides, FIG. 2 is a perspective view showing one example of the structure of such an acceleration sensor. An acceleration sensor 50 comprises a rectangular parallelepiped vibrator 51 formed of a single crystal piezoelectric body, a long rectangular parallelepiped weight section 52 and a flat rectangular parallelepiped substrate 53. Here, although the vibrator 51 is formed of a single crystal piezoelectric body, needless to say, there is no problem even if the vibrator 51 is made of other piezoelectric body such as piezoelectric ceramics. Others are the same as below. The vibrator 51 is bonded to one end portion of the weight section 52 through an adhesive layer 54. An end portion of the vibrator 51, which faces the substrate 53, is substantially divided into two regions in its longitudinal direction, and electrodes 55 are formed on the respective front surfaces. Moreover, a pattern of electrodes 56 is formed on the front surface of the substrate 53 (a face facing the vibrator 51), and the electrodes 55 and 56 are bonded together through an adhesive layer 57.

In the case where the acceleration sensor 50 having such a structure is bonded to a specimen, when an acceleration (the void arrow direction in FIG. 2) in one direction (the width direction) is applied, an angular moment about the support point is produced at the weight section 52 by the positional difference between the center of gravity of the weight section 52 and the support point, and sliding vibrations of different orientations in the width direction are produced in both of the divided regions of the vibrator 51. Then, by drawing a voltage resulting from these sliding vibrations from the electrodes 55 via the electrodes 56 of the substrate 53 and by amplifying and detecting the voltage signal, the acceleration is detected.

Besides, the applicant of the present invention has also proposed an acceleration sensor constructed by dividing a face of the vibrator 51 on the weight section 52 side instead of a face on the substrate 53 side as described above.

The present inventor et al. are pursuing the development and improvement of such an acceleration sensor that has a small-sized structure and a high detection sensitivity without increasing the size of the vibrator itself to achieve high performance because it detects sliding vibration instead of deflective vibration.

In such an acceleration sensor, when the formation pattern of the electrodes 56 on the substrate 53 shown in the structure of FIG. 2 is asymmetrical or when the respective electrodes 56 have different thickness, the vibrator 51 inclines and causes a problem that the detection sensitivity varies.

Further, even when a resonance frequency of the vibrator 51 itself is set out of an operating frequency band of the acceleration sensor 50, if a resonance frequency of the substrate 53 is included within the operating frequency band, a signal of the resonance frequency of the substrate 53 is received, which causes a problem that flat detection sensitivity characteristics can not be obtained within the operating frequency band.

BRIEF SUMMARY OF THE INVENTION

An object of the present invention is to provide an acceleration sensor capable of reducing variation in the detection sensitivity and progressing the flatness of the detection sensitivity within an operating frequency band by improving a previously proposed acceleration sensor.

An acceleration sensor according to the first aspect of the present invention is an acceleration sensor comprising a vibrator subject to a sliding vibration and a weight section connected to the vibrator and supported at a position different from a position of a center of gravity of an assembly of the vibrator and weight section, for detecting an angular moment about the support point, which is produced at the weight section by application of acceleration, as sliding vibration with the vibrator, wherein the acceleration sensor comprises a rectangular substrate having a plurality of electrodes electrically connected to the vibrator, a formation pattern of the plurality of electrodes is symmetrical about an axis parallel to at least one side of the substrate, and the plurality of electrodes have substantially equal thickness. Since the formation pattern of the electrodes on the substrate is symmetrical and the respective electrodes have substantially equal thickness, the vibrator that is bonded to this substrate does not incline and the detection sensitivity does not vary, thereby improving the detection sensitivity characteristics.

An acceleration sensor according to the second aspect of the present invention is an acceleration sensor comprising a vibrator subject to a sliding vibration and a weight section connected to the vibrator and supported at a position different from a position of a center of gravity of an assembly of the vibrator and weight section, for detecting an angular moment about the support point, which is produced at the weight section by application of acceleration, as sliding vibration with the vibrator, wherein the weight section is provided with a plurality of electrodes electrically connected to the vibrator, a formation pattern of the plurality of electrodes is symmetrical about an axis parallel to at least one side of the weight section, and the plurality of electrodes have substantially equal thickness. Since the formation pattern of the electrodes on the weight section is symmetrical and the respective electrodes have substantially equal thickness, the vibrator that is bonded to this weight section does not incline and the detection sensitivity does not vary, thereby improving the detection sensitivity characteristics.

An acceleration sensor according to the third aspect of the present invention is an acceleration sensor comprising a vibrator subject to a sliding vibration and a weight section connected to the vibrator and supported at a position different from a position of a center of gravity of an assembly of the vibrator and weight section, for detecting an angular moment about the support point, which is produced at the weight section by application of acceleration, as sliding vibration with the vibrator, wherein the acceleration sensor comprises a rectangular substrate having a plurality of electrodes electrically connected to the vibrator, a formation pattern of the plurality of electrodes is symmetrical about an axis parallel to at least one side of the substrate, and an inclination angle of the vibrator to the substrate is not larger than 40°. Although the vibrator inclines with respect to the substrate, since the inclination angle is not larger than 40°, it is possible to limit the variation in the detection sensitivity not to be higher than around 30%.

An acceleration sensor according to the fourth aspect of the present invention is an acceleration sensor comprising a vibrator subject to a sliding vibration and a weight section connected to the vibrator and supported at a position different from a position of a center of gravity of an assembly of the vibrator and weight section, for detecting an angular moment about the support point, which is produced at the weight section by application of acceleration, as sliding vibration with the vibrator, wherein the acceleration sensor comprises a substrate for taking out a result of the detection by the vibrator, and a mechanical resonance frequency of the substrate is out of an operating frequency band of the acceleration sensor. Since the mechanical resonance frequency of the substrate is set out of the operating frequency band of the acceleration sensor, it is possible to obtain flat detection sensitivity characteristics within the operating frequency band.

An acceleration sensor according to the fifth aspect of the present invention is an acceleration sensor comprising a vibrator subject to a sliding vibration and a weight section connected to the vibrator and supported at a position different from a position of a center of gravity of an assembly of the vibrator and weight section, for detecting an angular moment about the support point, which is produced at the weight section by application of acceleration, as sliding vibration with the vibrator, wherein the acceleration sensor comprises a substrate for taking out a result of the detection by the vibrator, and a mechanical resonance frequency of an integral construction of the vibrator, weight section and substrate is out of an operating frequency band of the acceleration sensor. Since the mechanical resonance frequency of the integral construction of the vibrator, weight section and substrate is set out of the operating frequency band of the acceleration sensor, it is possible to obtain flat detection sensitivity characteristics within the operating frequency band.

An acceleration sensor according to the sixth aspect of the present invention is an acceleration sensor comprising a vibrator subject to a sliding vibration and a weight section connected to the vibrator and supported at a position different from a position of a center of gravity of an assembly of the vibrator and weight section, for detecting an angular moment about the support point, which is produced at the weight section by application of acceleration, as sliding vibration with the vibrator, wherein the acceleration sensor comprises a substrate for taking out a result of the detection by the vibrator and a cap section for covering the vibrator and weight section, and a mechanical resonance frequency of an integral construction of the vibrator, weight section, substrate and cap section is out of an operating frequency band of the acceleration sensor. Since the mechanical resonance frequency of the integral construction of the vibrator, weight section, substrate and cap section is set out of the operating frequency band of the acceleration sensor, it is possible to obtain flat detection sensitivity characteristics within the operating frequency band.

The above and further objects and features of the invention will more fully be apparent from the following detailed description with accompanying drawings.

DETAILED DESCRIPTION OF THE INVENTION

The following description will explain the present invention in detail with reference to the drawings illustrating some embodiments thereof.

(First Embodiment)

Figure 1:
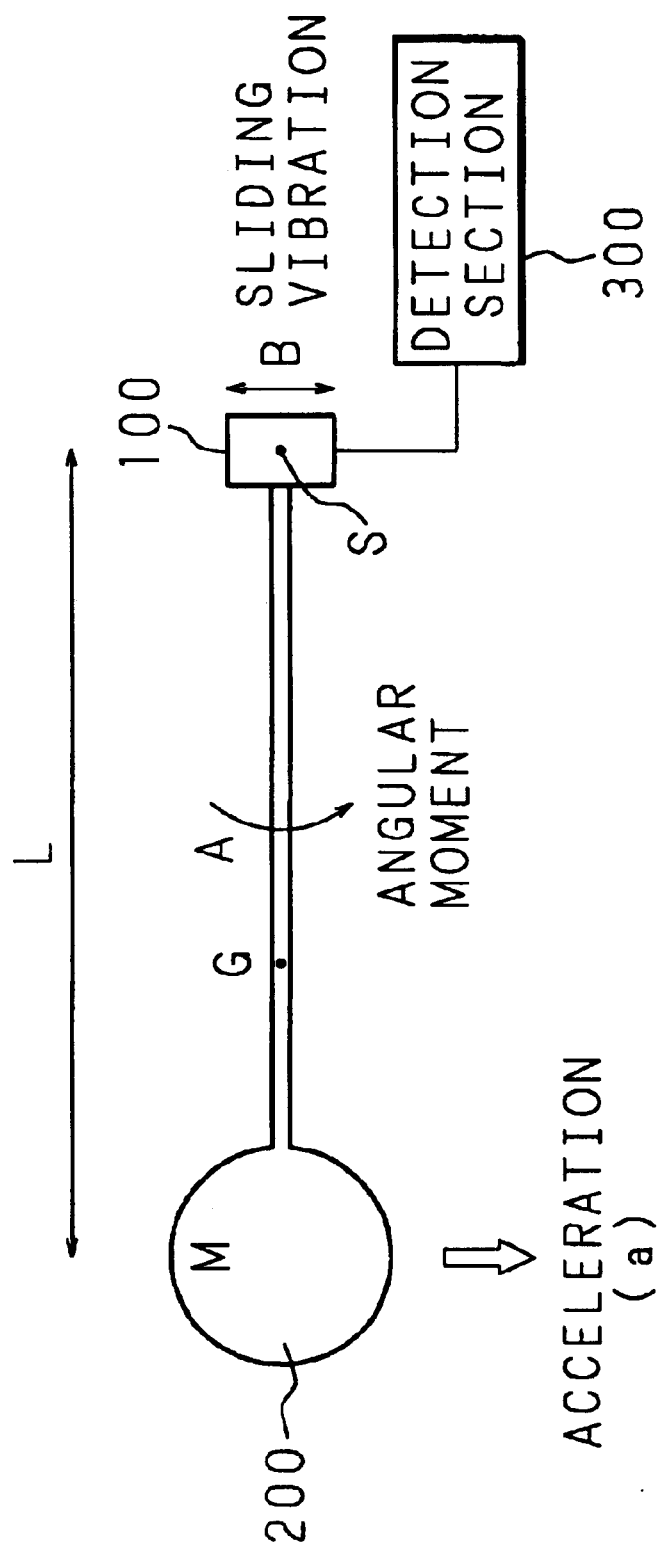
FIG. 1 is an explanatory view showing the detection principle of an acceleration sensor.
Figure 2:
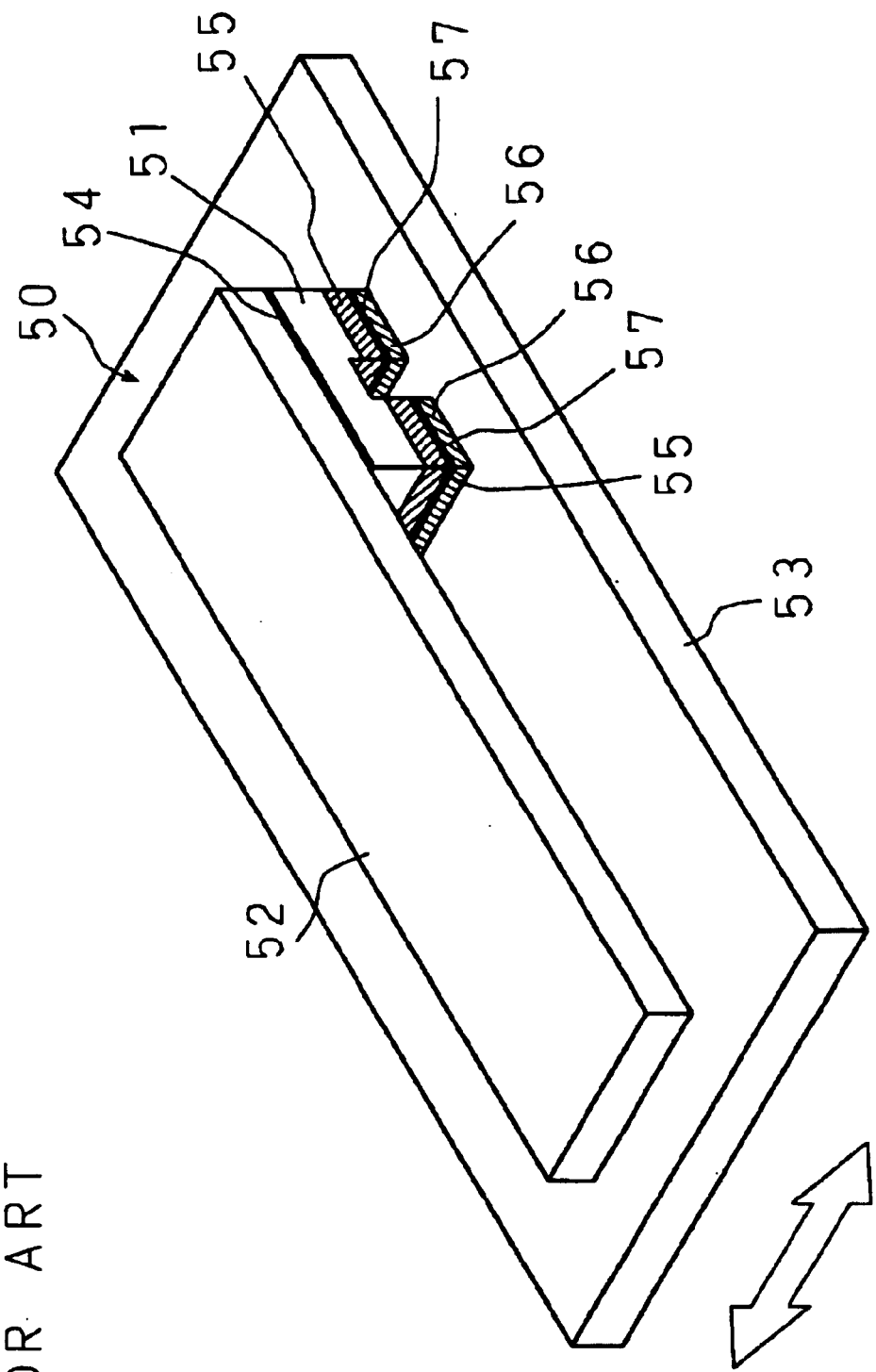
FIG. 2 is a perspective view showing one example of the structure of a conventional acceleration sensor.
Figure 3A:
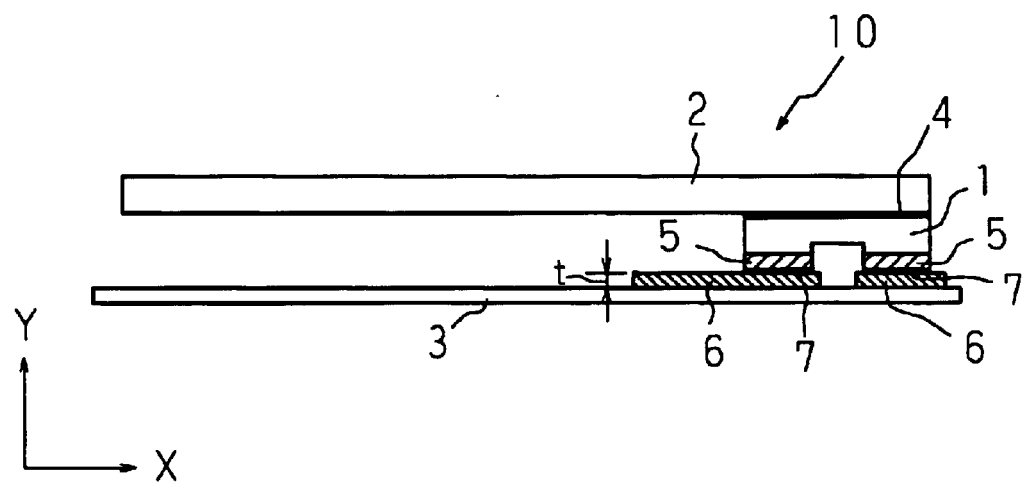
FIG. 3A is a cross sectional view showing the structure of an acceleration sensor according to the first embodiment.
Figure 3B:
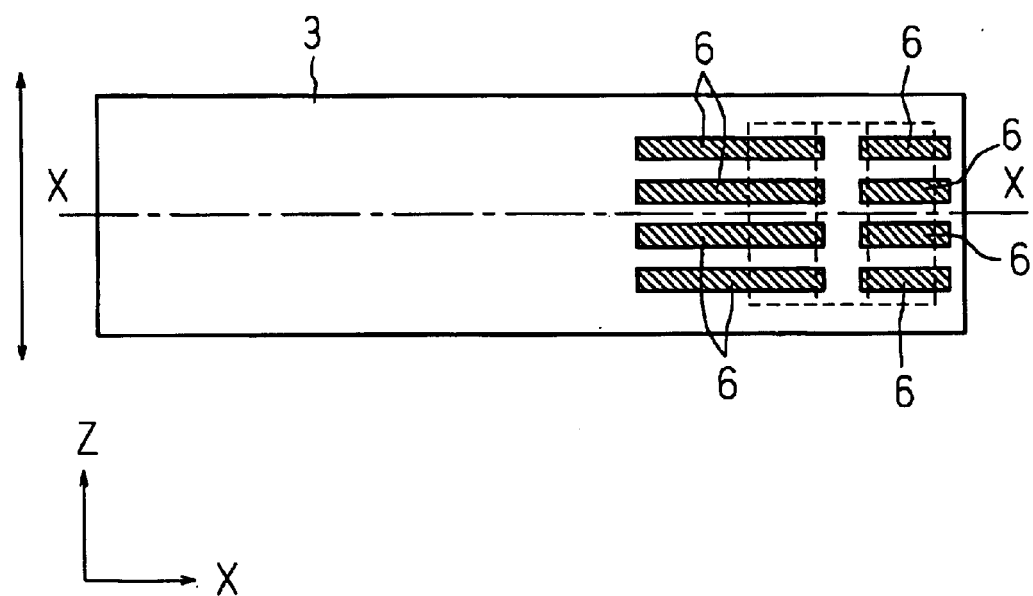
FIG. 3B is a plan view of a substrate of the acceleration sensor according to the first embodiment.

FIG. 3A is a cross sectional view showing the structure of an acceleration sensor 10 according to the first embodiment of the present invention, and FIG. 3B is a plan view of a substrate 3 of the acceleration sensor 10. The acceleration sensor 10 comprises a rectangular parallelepiped vibrator 1 (for example, length: 1.3 mm, width: 2.5 mm, thickness: 0.5 mm) formed of a LiNbO$_3$ (lithium niobate) single crystal piezoelectric body with 165° Y and $\theta$=39°, for example; a long rectangular parallelepiped weight section 2 (length: 5.8 mm, width: 2.5 mm, thickness: 0.5 mm) formed of alumina ceramics; and a flat rectangular parallelepiped substrate 3 formed of alumina ceramics.

The vibrator 1 is bonded to one end portion of the weight section 2 through a first adhesive layer 4. An end portion of the vibrator 1, which faces the substrate 3, is substantially divided into two regions in its longitudinal direction, and electrodes 5 are formed on the respective front surfaces.

Moreover, a pattern of electrodes 6 is formed on the front surface of the substrate 3 (a face facing the vibrator 1). These electrodes 5 and 6 are bonded together through a second adhesive layer 7.

As illustrated in FIG. 3B, the pattern of the electrodes 6 formed on the front surface of the substrate 3 is symmetrical about the axis X—X parallel to a longitudinal direction (the X-axis direction) of the substrate 3. Further, these electrodes 6 have equal thickness t. Since the electrodes 6 have such a structure, the vibrator 1 to be bonded thereto does not incline, thereby preventing variation in the detection sensitivity. Note that the broken line in FIG. 3B indicates the installation position of the vibrator 1.

When the acceleration sensor 10 having such a structure is bonded to a specimen, when an acceleration (the front-back direction in FIG. 3A, the arrow direction in FIG. 3B) in one direction (the width direction: the Z-axis direction) is applied, an angular moment about the support point is produced at the weight section 2 by the positional difference between the center of gravity of the weight section 2 and the support point, and sliding vibrations of different orientations in the width direction are produced in both of the divided regions of the vibrator 1. Then, by drawing a voltage resulting from the sliding vibrations from the electrodes 5 via the electrodes 6 of the substrate 3 and by amplifying and detecting the voltage signal, the acceleration is detected.

Figures 4A, 4B:
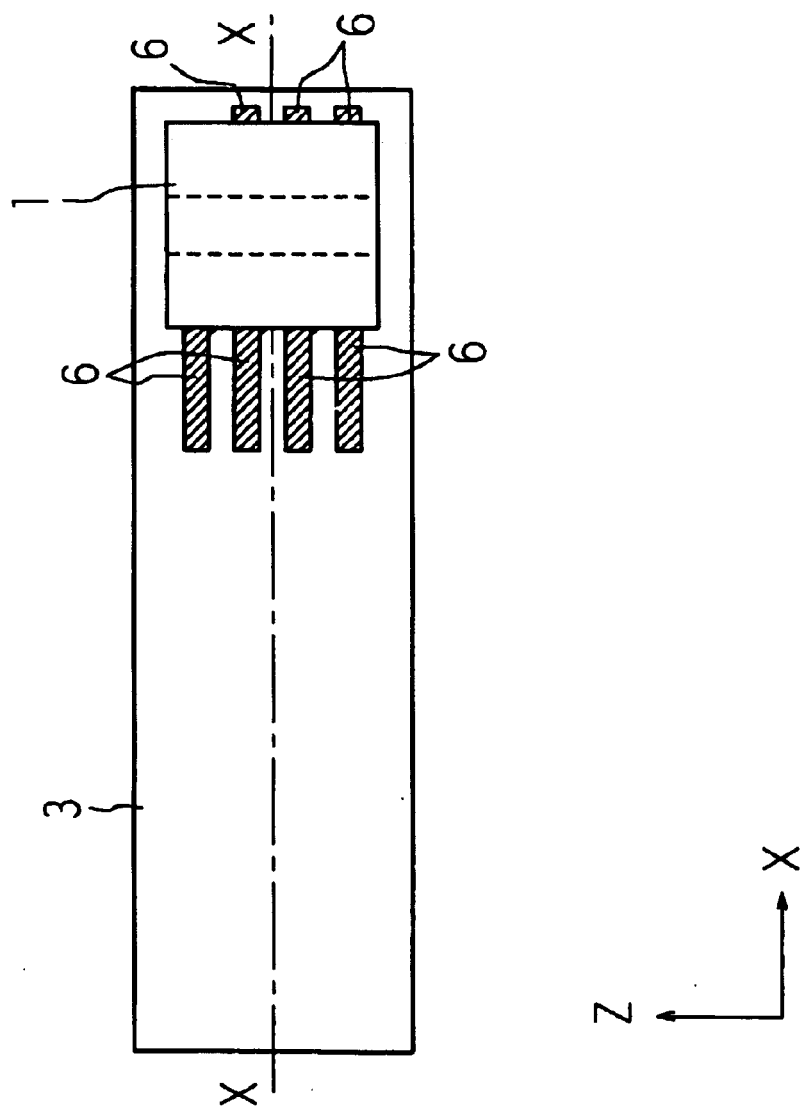
FIGS. 4A and 4B are plan view and cross sectional view showing the structure of an acceleration sensor as a comparative example of the first embodiment.
Figures 5A, 5B:
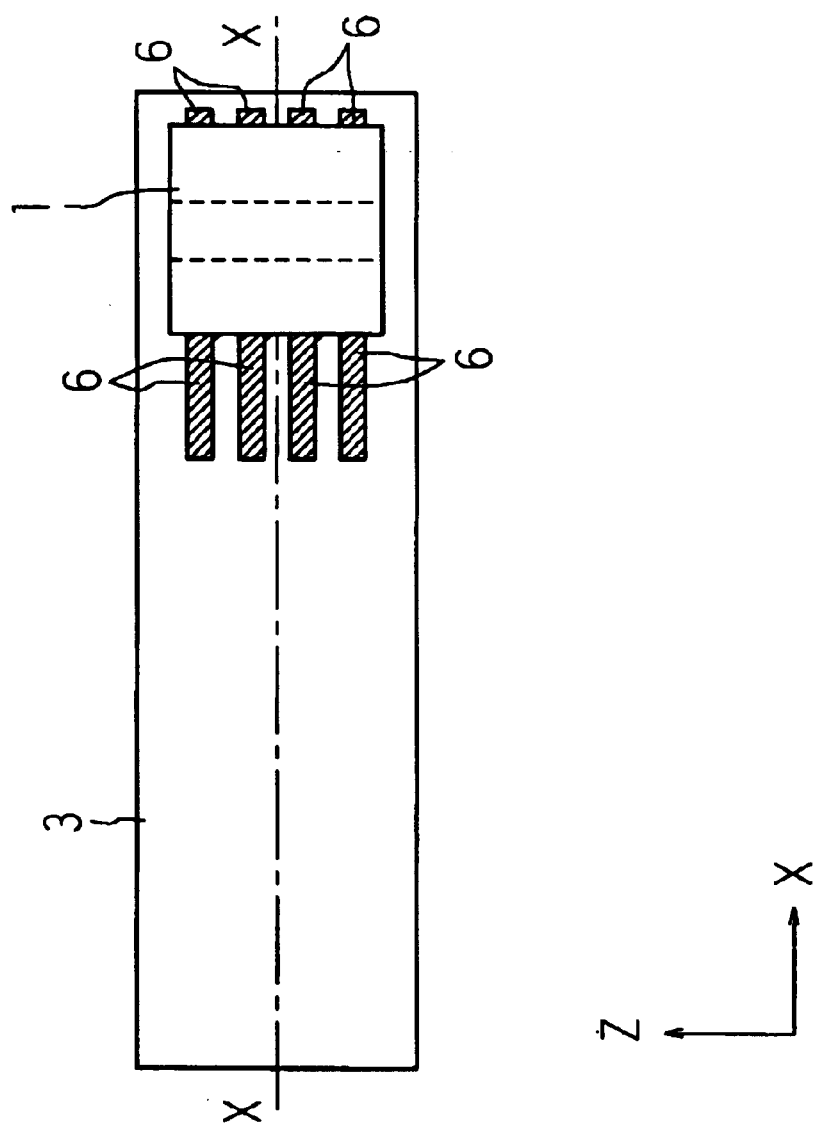
FIGS. 5A and 5B are plan view and cross sectional view showing the structure of an acceleration sensor as a comparative example of the first embodiment.

When the detection sensitivity of such an acceleration sensor 10 of the first embodiment was measured, every sample showed good detection sensitivity of 100 mV/G. For a comparison purpose, an acceleration sensor in which a part of the electrodes 6 is missing and the formation pattern is asymmetrical as shown in FIGS. 4A and 4B was fabricated, and the detection sensitivity was measured. According to the results of the measurement, two samples had detection sensitivity of 10 mV/G and 15 mV/G, respectively. Moreover, an acceleration sensor in which the electrodes 6 do not have equal thickness as shown in FIGS. 5A and 5B was fabricated, and the detection sensitivity was measured. The result of the measurement was 4 mV/G. Degradation of the detection sensitivity in these comparative examples was caused by an inclination of the vibrator 1. It should be noted that illustration of the weight section 2 is omitted in FIGS. 4A, 4B, 5A and 5B.

(Second Embodiment)

Figure 6:
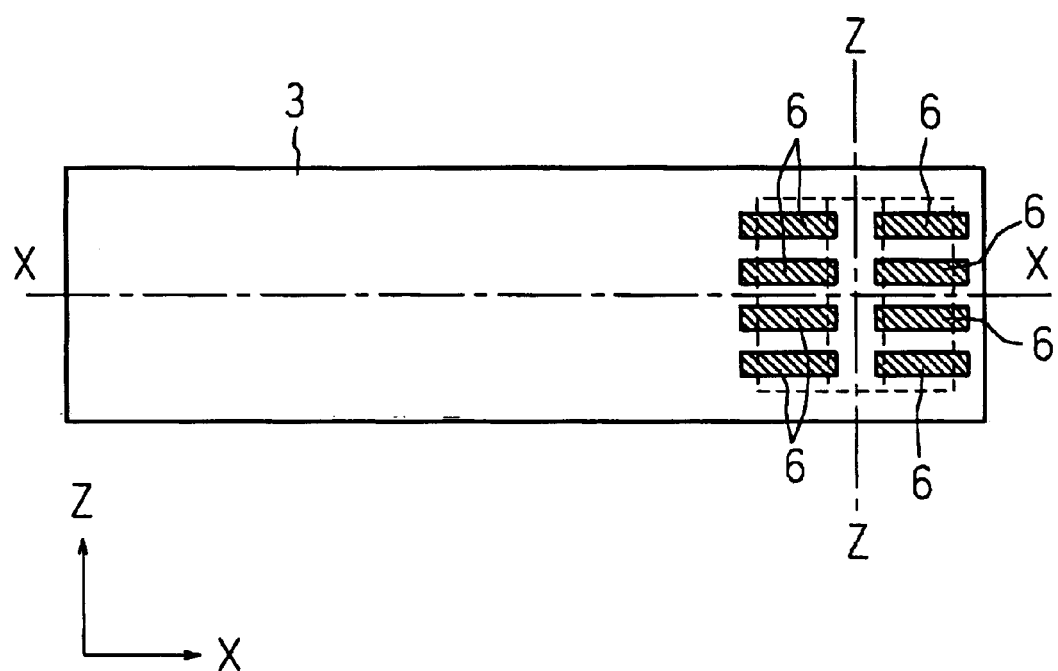
FIG. 6 is a plan view of a substrate of an acceleration sensor according to the second embodiment.

FIG. 6 is a plan view of the substrate 3 of the acceleration sensor 10 according to the second embodiment of the present invention. The electrodes 6 that are formed on the front surface of the substrate 3 (a face on the vibrator 1 side) and are to be bonded to the electrodes 5 of the vibrator 1 have equal thickness. In this embodiment, the pattern of the electrodes 6 is formed symmetrically not only about the axis X—X parallel to the longer-side direction (the X-axis direction) of the substrate 3, but also about the axis Z—Z parallel to the shorter-side direction (the Z-axis direction) thereof.

(Third Embodiment)

Figure 7A:
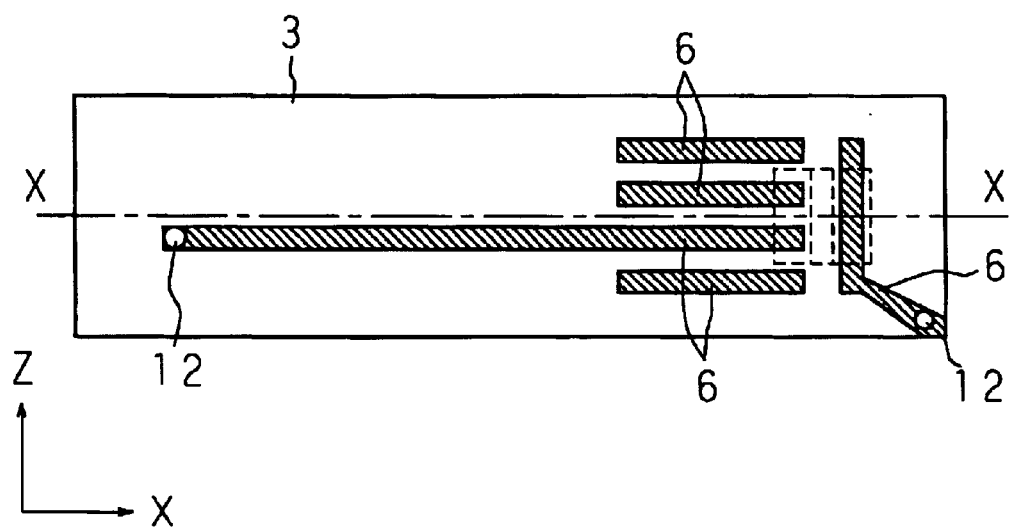
FIGS. 7A and 7B are plan views of a substrate of an acceleration sensor according to the third embodiment.
Figure 7B:
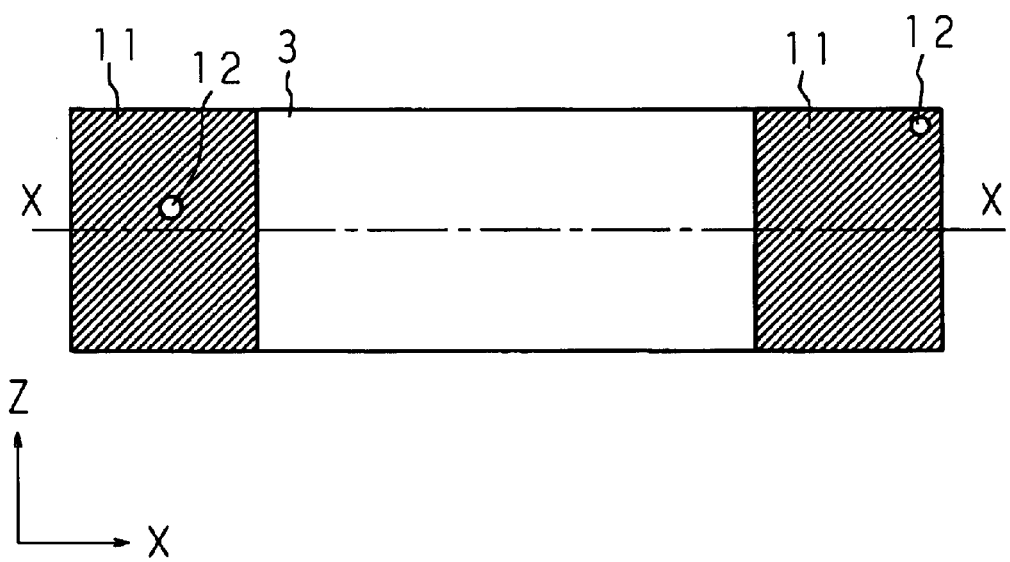

FIGS. 7A and 7B are plan views of the substrate 3 of the acceleration sensor 10 according to the third embodiment of the present invention, FIG. 7A illustrates a face on the front side (the vibrator 1 side) of the substrate 3, and FIG. 7B shows a face on the back side (the opposite side to the vibrator 1) thereof. The electrodes 6 that are formed on the front surface of the substrate 3 and are to be bonded to the electrodes 5 of the vibrator 1 have equal thickness. The substrate 3 is provided with through holes 12 that are formed to electrically connect the electrodes 6 on its front surface and electrodes 11 on its back surface. In this embodiment, the pattern of the electrodes 6 as a whole is asymmetrical because of the formation of the through holes 12, but, since the formation pattern of the electrodes 6 is symmetrical about the axis X—X within the installation position (shown by the broken line) of the vibrator 1, the detection sensitivity does not vary like the first embodiment.

(Fourth Embodiment)

Figure 8A:
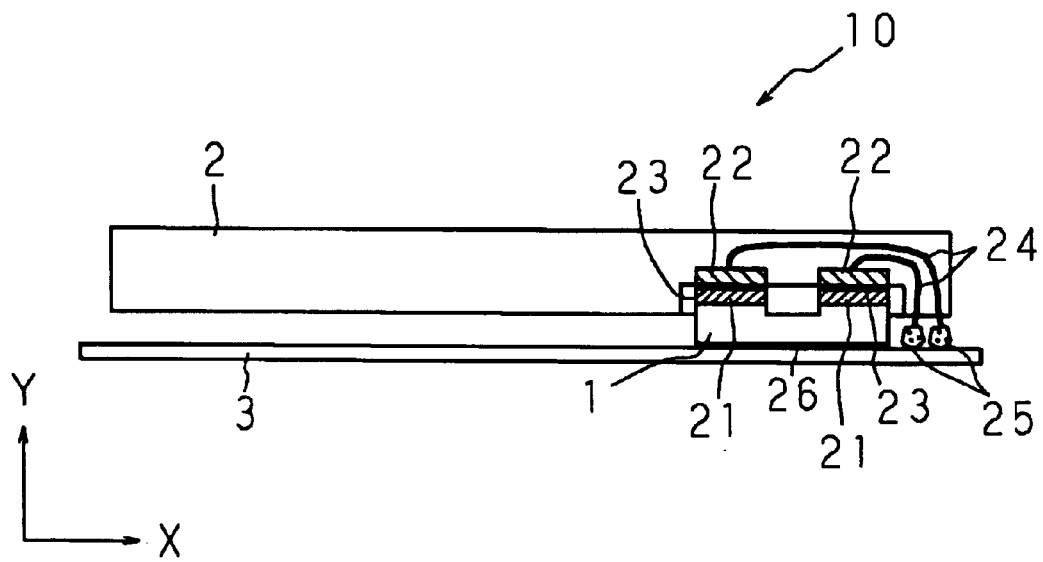
FIG. 8A is a cross sectional view showing the structure of an acceleration sensor according to the fourth embodiment.
Figure 8B:
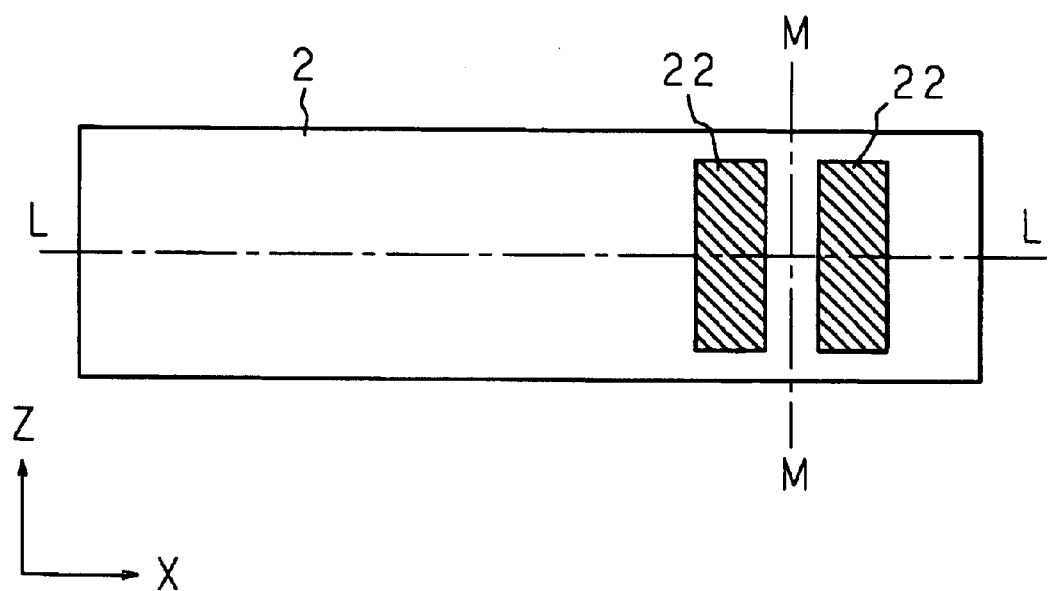
FIG. 8B is a plan view of a weight section of the acceleration sensor according to the fourth embodiment.

FIG. 8A is a cross sectional view showing the structure of the acceleration sensor 10 according to the fourth embodiment of the present invention, and FIG. 8B is a plan view of the weight section 2 thereof. Like the first embodiment, the acceleration sensor of this embodiment also comprises the vibrator 1, weight section 2 and substrate 3.

In this embodiment, an end portion of the vibrator 1, which faces the weight section 2, is substantially divided into two regions in its longitudinal direction, and electrodes 21 are formed on the respective front surfaces. Moreover, a pattern of electrodes 22 is formed on the front surface of the weight section 2 (a face facing the vibrator 1). These electrodes 21 and 22 are bonded together through a third adhesive layer 23. Wiring lines 24 are drawn from the electrodes 22 and connected to the substrate 3 through conductive pastes 25. Alternatively, it is also possible to regard the weight section 2 as a printed board and form the electrode pattern and connect it to the substrate 3 through the conductive pastes 25. Further, the vibrator 1 is bonded to one end portion of the substrate 3 through a fourth adhesive layer 26.

As illustrated in FIG. 8B, the pattern of the electrodes 22 formed on the front surface of the weight section 2 is symmetrical about the axis L—L parallel to the longer-side direction (the X-axis direction) of the weight section 2 and also about the axis M—M parallel to the shorter-side direction (Z-axis direction) thereof. Moreover, these electrodes 22 have equal thickness. Since the electrodes 22 have such a structure, the vibrator 1 to be bonded thereto does not incline, thereby preventing variation in the detection sensitivity.

Where the acceleration sensor 10 having such a structure is bonded to a specimen, like the first embodiment, sliding vibration corresponding to acceleration is also produced in both of the divided regions of the vibrator 1. Then, by drawing a voltage resulting from the sliding vibrations from the electrodes 21 via the electrodes 22 and wiring lines 24 to the substrate 3 and by amplifying and detecting the voltage signal, the acceleration is detected.

(Fifth Embodiment)

Figure 9:
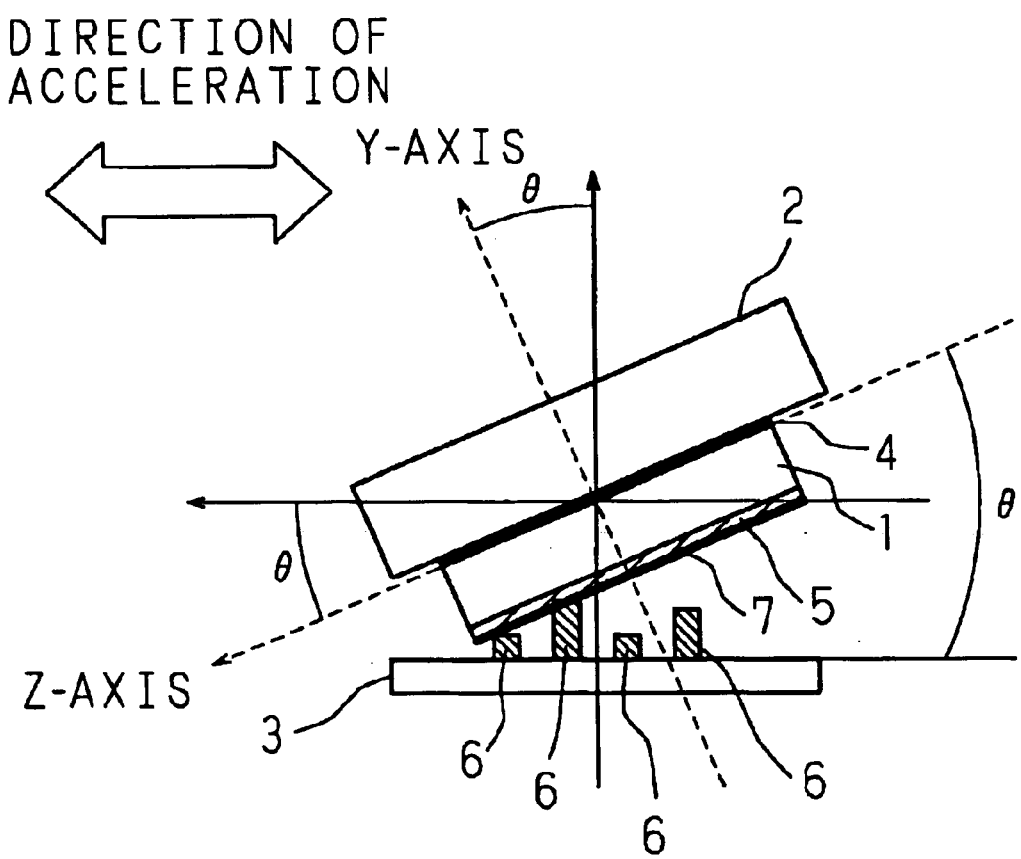
FIG. 9 is a cross sectional view showing the structure of an acceleration sensor according to the fifth embodiment.

Here, we will review the relationship between the inclination angle of the vibrator 1 and the detection sensitivity. FIG. 9 is a cross sectional view showing the structure of an acceleration sensor according to the fifth embodiment. If the direction of applying acceleration to be detected is equal to the width direction (Z-axis direction) of the acceleration sensor 10, the detection sensitivity is not affected by an inclination of the vibrator 1 in the longitudinal direction (X-axis direction) of the acceleration sensor 10. However, as shown in FIG. 9, when the Y-Z plane turns about the X-axis only at an angle θ and the vibrator 1 inclines only at the angle θ with respect to the substrate 3 due to variation in the thickness of the electrodes 6 formed on the substrate 3, the detection sensitivity becomes cos θ times a detection sensitivity obtained when the vibrator 1 does incline.

Figure 10:
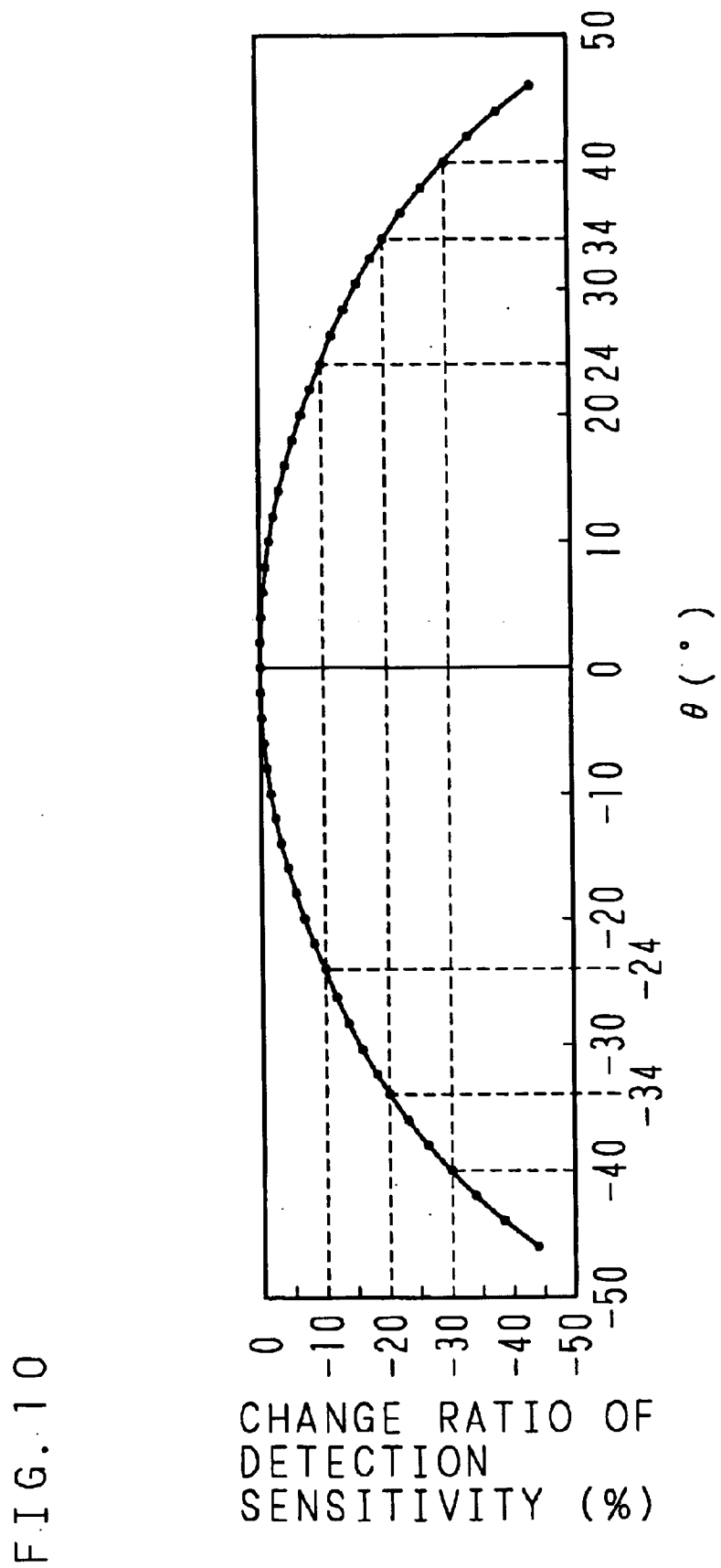
FIG. 10 is a graph showing the relationship between the inclination angle $\theta$ and the change ratio of detection sensitivity.

FIG. 10 is a graph showing the relationship between the inclination angle θ and the change ratio of detection sensitivity. It should be appreciated from the graph of FIG. 10 that when the inclination angle θ is within ranges of −40° to 40°, −34° to 34° and −24° to 24°, the variation in the detection sensitivity is not more than 30%, 20% and 10%, respectively. Accordingly, if the upper limit of the variation in the detection sensitivity is set 30%, the inclination angle θ of the vibrator 1 with respect to the substrate 3 should be made within a range of −40° to 40°. On the other hand, when the variation in the detection sensitivity is further to be reduced to no more than 20%, it is preferred to make the inclination angle θ within a range of −34° to 34°; and when the variation in the detection sensitivity is to be further reduced to no more than 10%, it is more preferred to make the inclination angle θ within a range of −24° to 24°.

(Sixth Embodiment)

Figure 11:
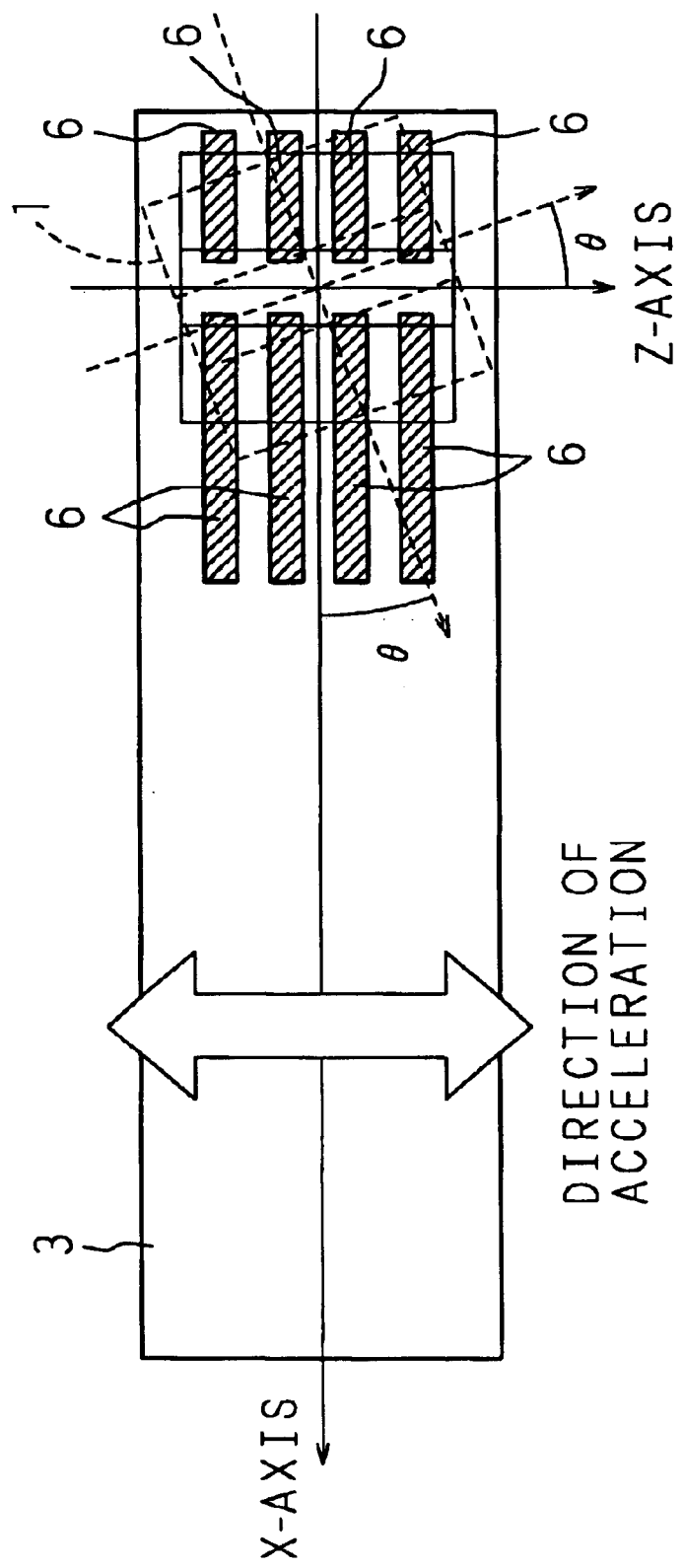
FIG. 11 is a plan view s showing the structure of an acceleration sensor according to the sixth embodiment.

FIG. 11 is a plan view showing the structure of an acceleration sensor according to the sixth embodiment. While the above fifth embodiment is illustrated with reference to an example in which the Y-Z plane turns about the X-axis at only the angle θ, the same can also be said for the case where the X-Z plane turns about the Y-axis at only the angle θ as shown in FIG. 11. Accordingly, in this case, the inclination angle θ is also preferably between −40° and 40°, more preferably between −34° and 34°, and still more preferably between −24° and 24°.

(Seventh Embodiment)

Figure 13A:
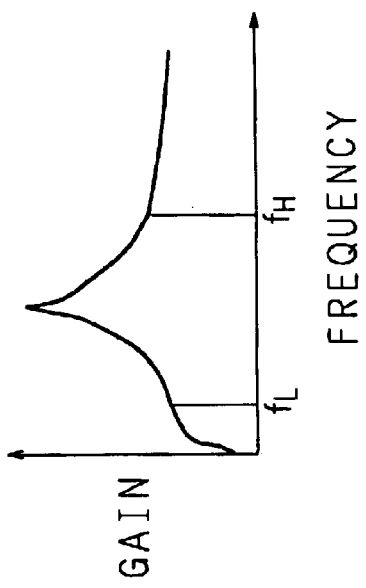
FIGS. 13A through 13C are graphs showing the frequency characteristics for explaining problems associated with conventional examples.
Figure 13B:
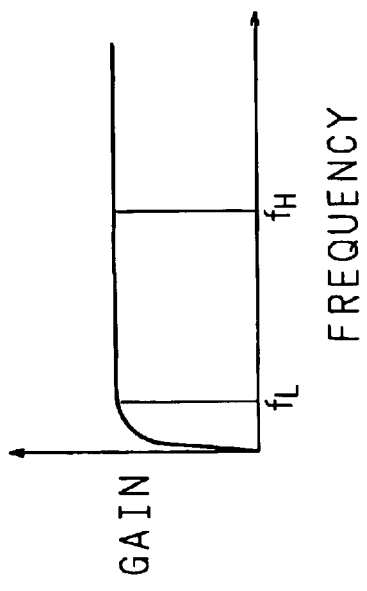
Figure 13C:
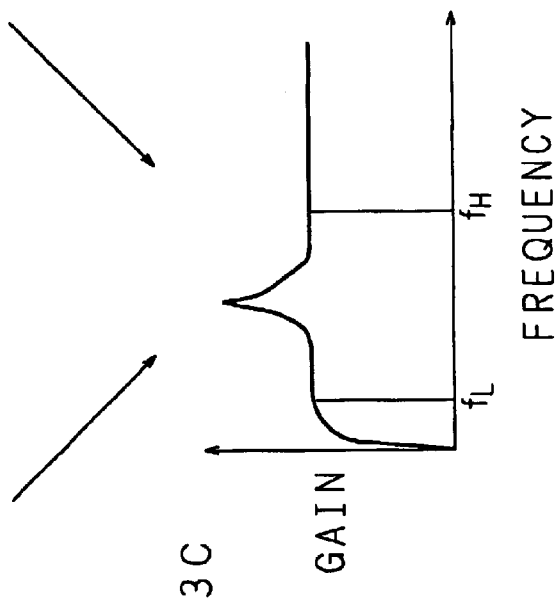

The detection sensitivity characteristics required for the acceleration sensor 10 are flat characteristics (whose variation range is within 3 dB) within an operating frequency band ($f_L$ through $f_H$, $f_L$: the lowest operating frequency; $f_H$: the highest operating frequency). Therefore, the resonance frequency of the vibrator 1 itself is usually set within a range sufficiently higher than $f_H$ so as to prevent the resonance of the vibrator 1 from affecting an acceleration detection process. However, even when the resonance frequency of the vibrator 1 itself is set within the range sufficiently higher than $f_H$ (FIG. 13A), if the mechanical resonance frequency of the substrate 3 is present within the operating frequency band (FIG. 13B), the flatness in the detection sensitivity is impaired within the operating frequency band (FIG. 13C) because the substrate 3 is bonded to the vibrator 1.

Figure 12:
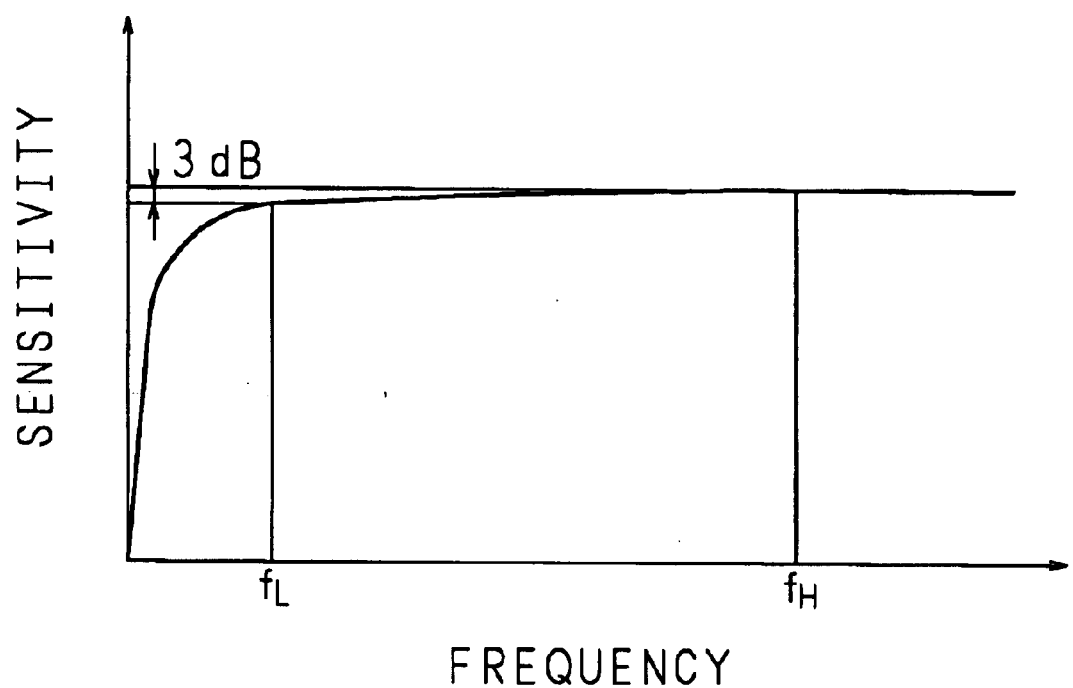
FIG. 12 is a graph showing the detection sensitivity characteristics required for an acceleration sensor.

Considering from this point of view, in the seventh embodiment, the resonance point of the substrate 3 is set out of the operating frequency band, and the mechanical resonance frequency is set out of the operating frequency band. As a result, in the seventh embodiment, it is possible to realize flat detection sensitivity characteristics as shown in FIG. 12 within the operating frequency band of the acceleration sensor 10.

Regarding the size of the substrate 3, by increasing the thickness or shortening the length of each side, it is possible to increase the mechanical resonance frequency of the substrate 3. More specifically, if the highest operating frequency fH in the operating frequency band is 10 kHz, for example, though it varies depending on the material of the substrate 3, when alumina ceramics is used as the material of the substrate 3, it is possible to set the mechanical resonance frequency of the substrate 3 within a range sufficiently higher than $f_H$ by arranging the size of the substrate 3 to have an area of around 5×8 mm and a thickness of 0.35 mm. On the other hand, when the substrate 3 is formed of a glass epoxy veneer, since it is softer than alumina ceramics, if some changes are made to substantially increase the rigidity of the substrate 3, such as to make the main body of the substrate 3 thicker or increase the width and thickness of the electrodes to be formed, it is possible to readily achieve a high resonance frequency.

(Eighth Embodiment)

Since the vibrator 1 and the substrate 3 are bonded together, the mechanical resonance frequency of an integral construction of the vibrator 1 and substrate 3 would affect the detection sensitivity of the acceleration sensor 10. Therefore, in the eighth embodiment, the mechanical resonance frequency of the integral construction of the vibrator 1 and substrate 3 is set out of the operating frequency band of the acceleration sensor 10. With this setting, like the seventh embodiment, it is possible to realize flat detection sensitivity characteristics as shown in FIG. 12 within the operating frequency band of the acceleration sensor 10.

(Ninth Embodiment)

Figure 14:
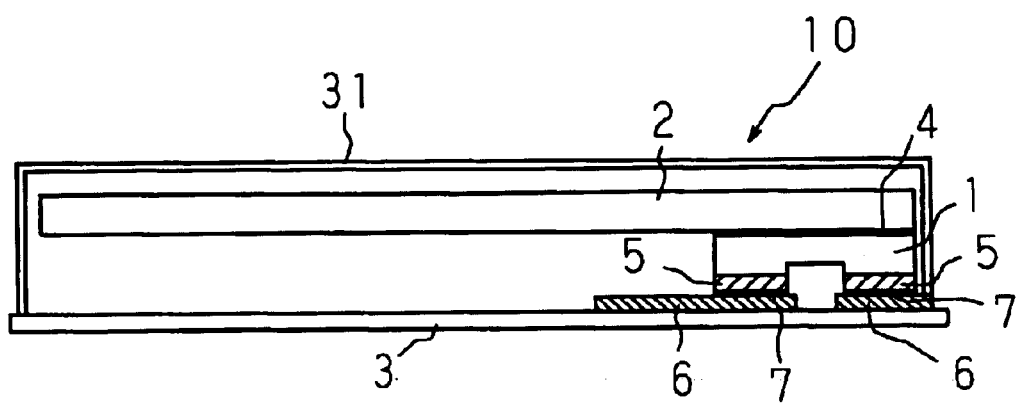
FIG. 14 is a cross sectional view showing the structure of an acceleration sensor according to the ninth embodiment.

FIG. 14 is a cross sectional view showing the structure of the acceleration sensor 10 according to the ninth embodiment of the present invention, and same parts as in FIG. 3A are designated with the same number and explanation thereof is omitted. In this embodiment, a cap section 31 having a square bracket-like cross section is attached and fixed to the circumference of the substrate 3 so as to house the vibrator 1 and weight section 2 therein. Moreover, in such an example, the mechanical resonance frequency of a construction including the vibrator 1, weight section 2, substrate 3 and cap section 31 as a unit participates in the detection sensitivity characteristics. In the ninth embodiment, therefore, the overall mechanical resonance frequency of this construction is set out of the operating frequency band of the acceleration sensor 10.

Figure 15A:
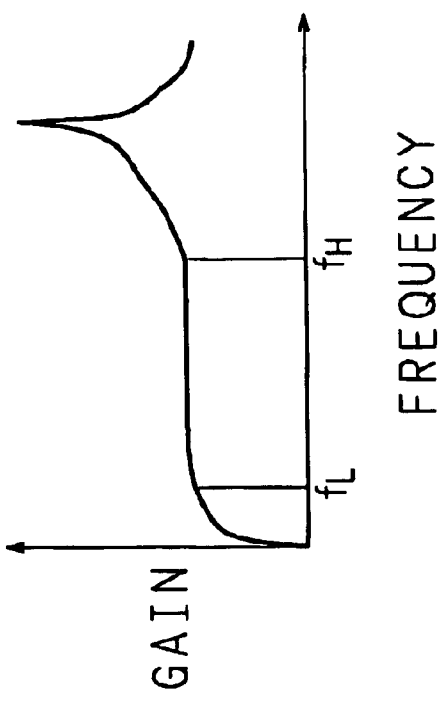
FIGS. 15A and 15B are graphs showing the frequency characteristics for explaining the acceleration sensor according to the ninth embodiment.
Figure 15B:
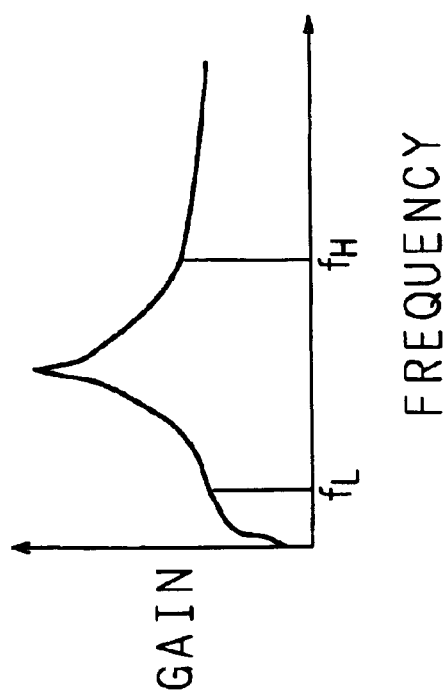

In the structure having no cap section 31, even when the overall mechanical resonance frequency is present within the operating frequency band, as shown in FIG. 15A, by providing the structure with the cap section 31 as in the ninth embodiment and setting the overall mechanical resonance frequency out of the operating frequency band as shown in FIG. 15B, it is possible to realize flat detection sensitivity characteristics as shown in FIG. 12 within the operating frequency band of the acceleration sensor 10.

Figure 16A:
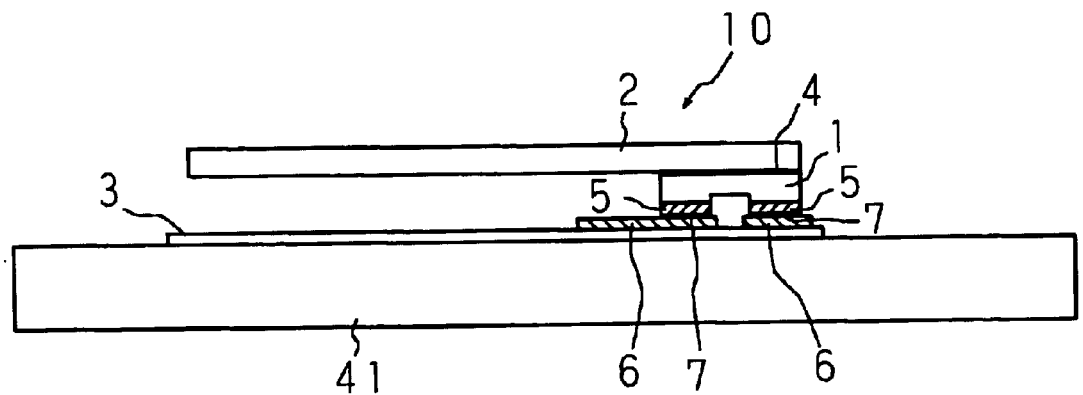
FIGS. 16A through 16C are cross sectional views showing the structures of acceleration sensors of modified examples of the seventh through ninth embodiments.
Figure 16B:
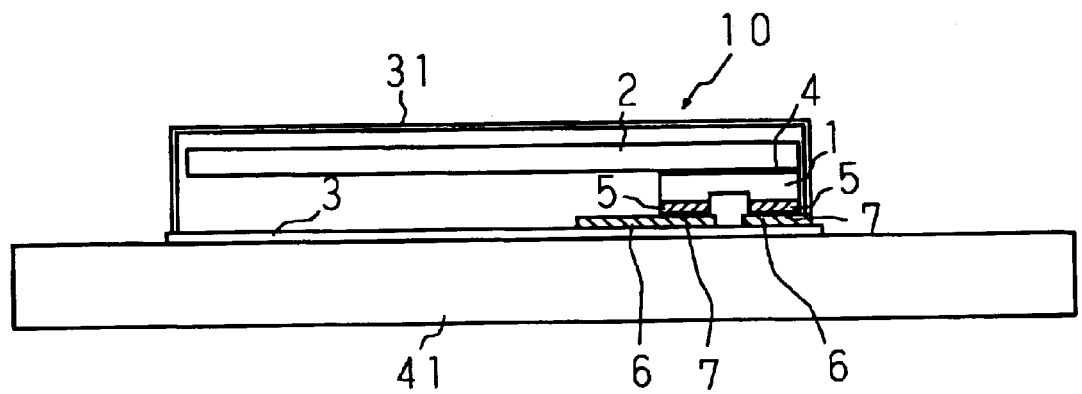
Figure 16C:
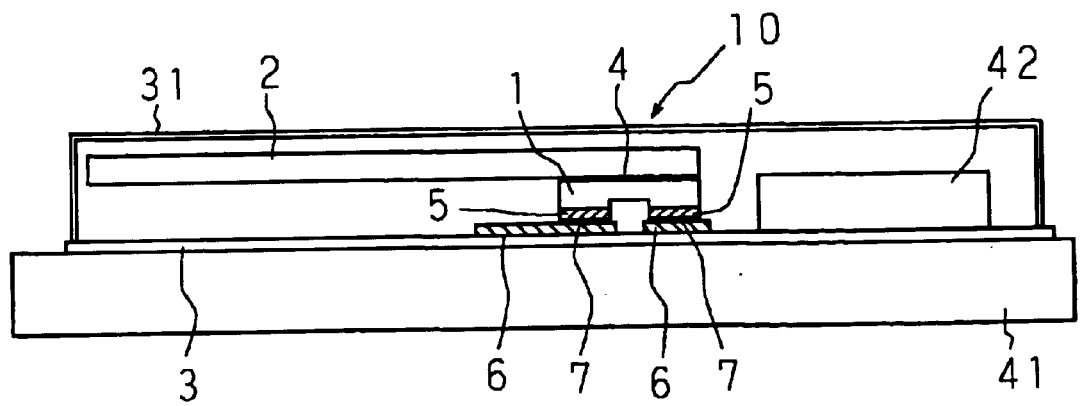

FIGS. 16A through 16C illustrate modified examples of the above-described seventh and ninth embodiments. As modes of actual application of the acceleration sensor 10, there may be a mode in which the vibrator 1 and weight section 2 provided on the substrate 3 are directly installed on a measuring system substrate 41 (FIG. 16A); a mode in which they are installed on the measuring system substrate 41 together with the cap section 31 which is attached as described in the ninth embodiment (FIG. 16B); a mode in which a processing circuit 42 (amplifying circuit, temperature compensation circuit, etc.) is mounted on the substrate 3 in addition to the vibrator 1 and weight section 2 and the substrate 3 is installed on the measuring system substrate 41 by covering them with the cap section 31 (FIG. 16C); etc. In any case, by setting the mechanical resonance frequency of the entire structure including the measuring system substrate 41 (and also including the processing circuit 42 in the mode of FIG. 16C) out of the operating frequency band, it is, of course, possible to realize flat detection characteristics as shown in FIG. 12 within the operating frequency band of the acceleration sensor 10.

Note that, needless to say, the mechanical resonance frequency setting method of the above-described seventh through ninth embodiments is applicable to either of a type where an end portion of the vibrator 1 on the substrate 3 side is divided as shown in the first embodiment and a type where an end portion of the vibrator 1 on the weight section 2 side is divided as described in the fourth embodiment.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An acceleration sensor for detecting an acceleration, comprising:

a vibrator subject to a sliding vibration; and a weight section connected to said vibrator and supported at a position different from a position of a center of gravity of an assembly of said vibrator and weight section, said acceleration sensor detecting an angular moment about the support point, which is produced at said weight section by application of acceleration, as sliding vibration with said vibrator, said acceleration sensor comprising a rectangular substrate having a plurality of electrodes electrically connected to said vibrator, wherein a formation pattern of said plurality of electrodes is symmetrical about an axis parallel to at least one side of said substrate, and said plurality of electrodes have substantially equal thickness.

2. An acceleration sensor for detecting an acceleration, comprising:

a vibrator subject to a sliding vibration; and a substantially rectangular parallelepiped weight section connected to said vibrator and supported at a position different from a position of a center of gravity of an assembly of said vibrator and weight section, said acceleration sensor detecting an angular moment about the support point, which is produced at said weight section by application of acceleration, as sliding vibration with said vibrator, wherein a plurality of electrodes electrically connected to said vibrator are formed on said weight section, a formation pattern of said plurality of electrodes is symmetrical about an axis parallel to at least one side of said weight section, and said plurality of electrodes have substantially equal thickness.

3. An acceleration sensor for detecting an acceleration, comprising:

a vibrator subject to a sliding vibration; and a weight section connected to said vibrator and supported at a position different from a position of a center of gravity of an assembly of said vibrator and weight section, said acceleration sensor detecting an angular moment about the support point, which is produced at said weight section by application of acceleration, as sliding vibration with said vibrator, said acceleration sensor comprising a rectangular substrate having a plurality of electrodes electrically connected to said vibrator, wherein a formation pattern of said plurality of electrodes is symmetrical about an axis parallel to at least one side of said substrate, and an inclination angle of said vibrator to said substrate is not larger than 40°.

4. An acceleration sensor for detecting an acceleration, comprising:

a vibrator subject to a sliding vibration; and a weight section connected to said vibrator and supported at a position different from a position of a center of gravity of an assembly of said vibrator and weight section, said acceleration sensor detecting an angular moment about the support point, which is produced at said weight section by application of acceleration, as sliding vibration with said vibrator, said acceleration sensor comprising a substrate for taking out a result of the detection by said vibrator, wherein a mechanical resonance frequency of said substrate is out of an operating frequency band of said acceleration sensor.

5. An acceleration sensor for detecting an acceleration, comprising:

a vibrator subject to a sliding vibration; and a weight section connected to said vibrator and supported at a position different from a position of a center of gravity of an assembly of said vibrator and weight section, said acceleration sensor detecting an angular moment about the support point, which is produced at said weight section by application of acceleration, as sliding vibration with said vibrator, said acceleration sensor comprising a substrate for taking out a result of the detection by said vibrator, wherein, a mechanical resonance frequency of an integral construction of said vibrator, weight section and substrate is out of an operating frequency band of said acceleration sensor.

6. An acceleration sensor for detecting an acceleration, comprising:

a vibrator subject to a sliding vibration; and a weight section connected to said vibrator and supported at a position different from a position of a center of gravity of an assembly of said vibrator and weight section, said acceleration sensor detecting an angular moment about the support point, which is produced at said weight section by application of acceleration, as sliding vibration with said vibrator, said acceleration sensor comprising a substrate for taking out a result of the detection by said vibrator, and a cap section for covering said vibrator and weight section, wherein a mechanical resonance frequency of an integral construction of said vibrator, weight section, substrate and cap section is out of an operating frequency band of said acceleration sensor.

* * * * *